Aug. 18, 1925.

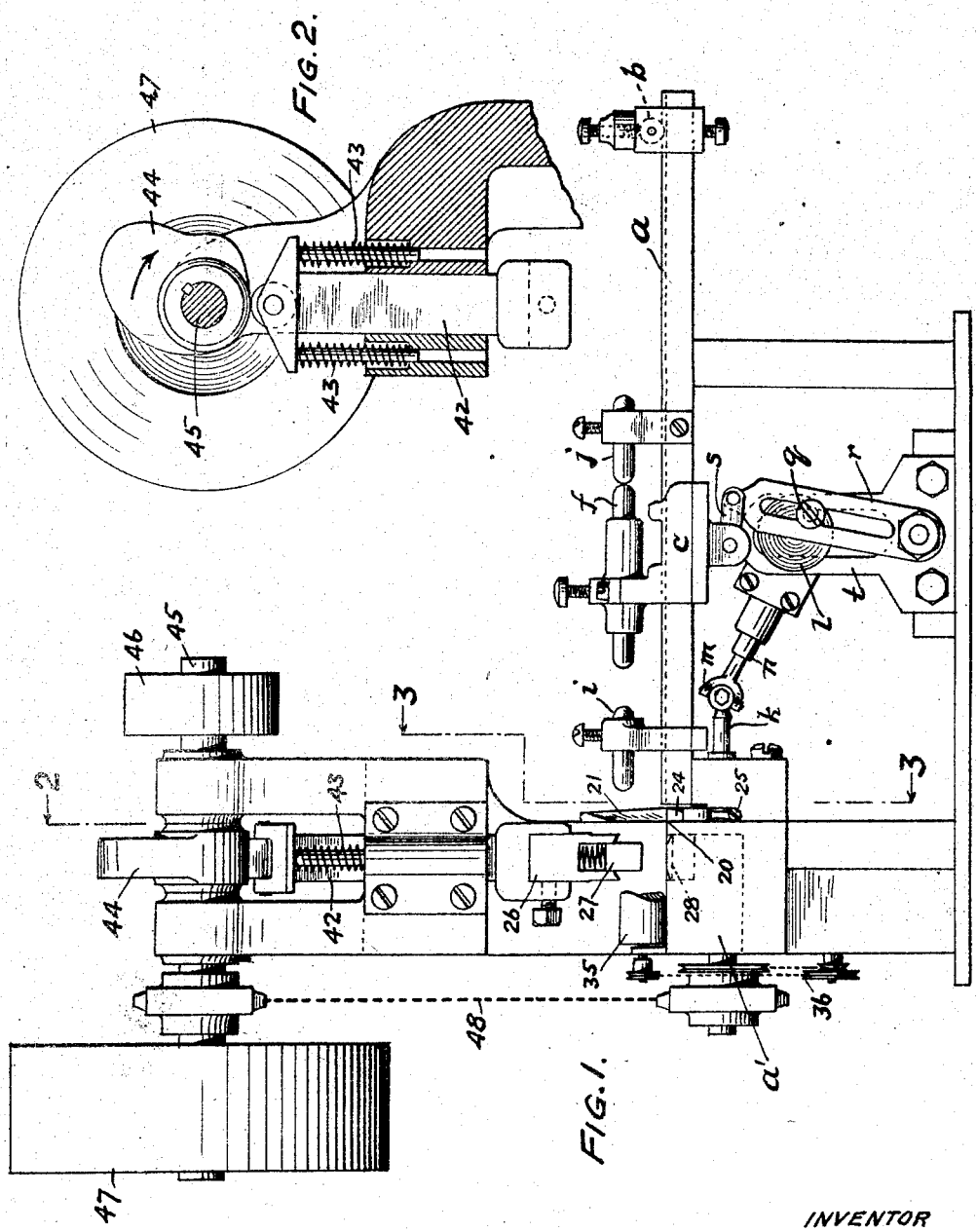

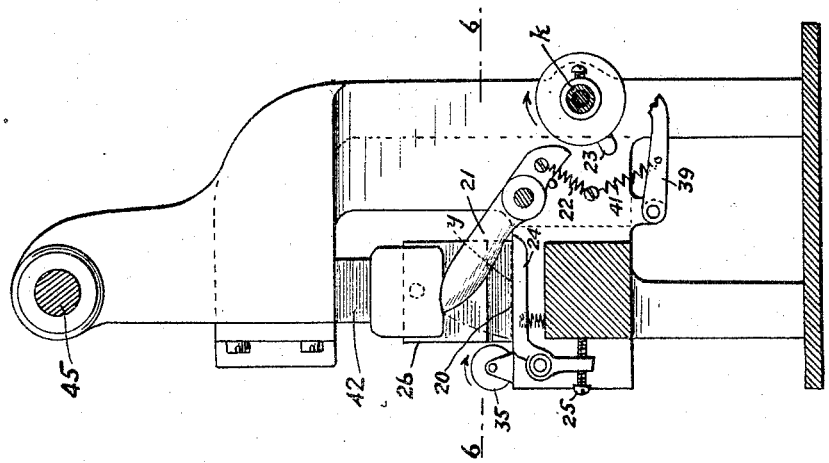
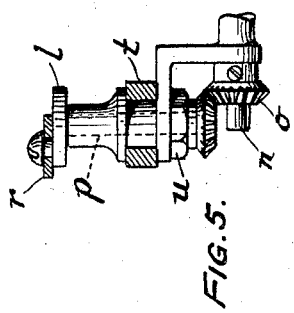
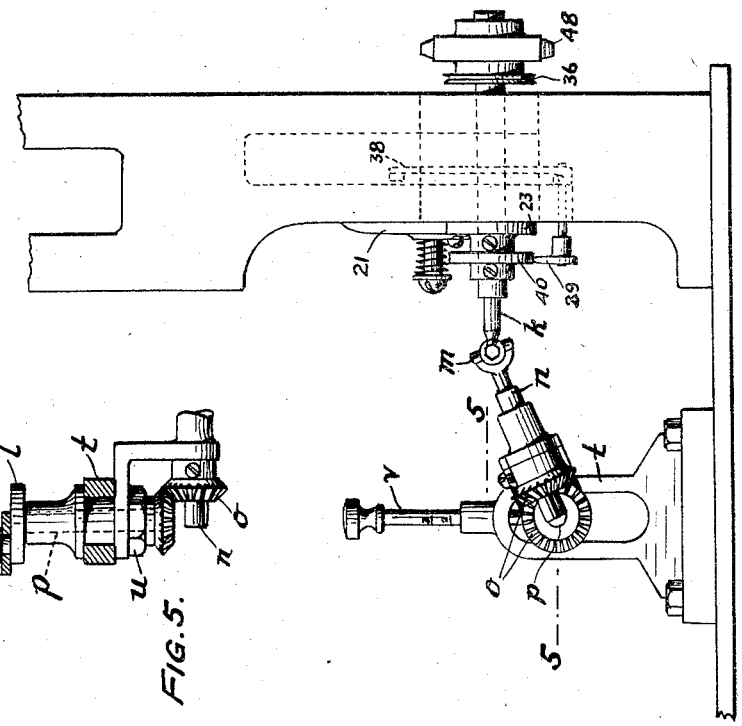

A. H. WALRATH 1,549,937

MACHINE FOR CUTTING AND FOLDING LABELS

Filed Feb. 20, 1923    4 Sheets-Sheet 3

WITNESS:

INVENTOR

Arthur H. Walrath
BY
Frank S. Busser
ATTORNEY.

Aug. 18, 1925.

A. H. WALRATH 1,549,937

MACHINE FOR CUTTING AND FOLDING LABELS

Filed Feb. 20, 1923    4 Sheets-Sheet 4

WITNESS:
Robt H Kitchel

INVENTOR
Arthur H. Walrath
BY
Frank S. Busser
ATTORNEY.

Patented Aug. 18, 1925.

1,549,937

UNITED STATES PATENT OFFICE.

ARTHUR H. WALRATH, OF PHILADELPHIA, PENNSYLVANIA, ASSIGNOR TO PITTS & KITTS MANUFACTURING & SUPPLY COMPANY, OF NEW YORK, N. Y., A CORPORATION OF NEW YORK.

MACHINE FOR CUTTING AND FOLDING LABELS.

Application filed February 20, 1923. Serial No. 620,159.

*To all whom it may concern:*

Be it known that I, ARTHUR H. WALRATH, a citizen of the United States, residing at Philadelphia, county of Philadelphia, and State of Pennsylvania, have invented a new and useful Improvement in Machines for Cutting and Folding Labels, of which the following is a full, clear, and exact description, reference being had to the accompanying drawings, which form a part of this specification.

My invention relates to the process of making labels or the like, whereby, after the labels have been printed or embroidered or woven continuously on strips of fabric, said strips may be entered into a machine and fed forward automatically step by step and each label cut off, its cut edges folded over and folded on the back of the label and the cut and folded labels expelled from the machine ready to be attached to the garments or other articles to be labelled.

The object of my invention is to provide a machine which accomplishes these results with neatness, precision and rapidity, and which at the same time is simple in its construction, whereby both its cost of manufacture and of upkeep is reduced to a minimum.

My invention comprises a feeding table, means to advance a strip of labels step by step in regulatable equal lengths upon the table, shears for cutting off the labels intermediate of the step-by-step feeding movement, and a press and die for folding the front and back freshly cut edges to produce an exact predetermined length of label.

I will proceed with a detailed description of a machine embodying my invention by which those skilled in the art will understand and appreciate its advantages, in connection with the accompanying drawings, in which—

Fig. 1 is a front view of the machine.

Fig. 2 is a sectional view on line 2, Fig. 1.

Fig. 3 is a side view of the press and shears on line 3—3, Fig. 1.

Fig. 4 is a rear view of a portion of the machine.

Fig. 5 is a horizontal section on line 5—5 of Fig. 4.

Fig. 12 shows a label after folding.

The machine comprises a longitudinal table $a$ with side flanges between which the strip $x$ of labels is adapted to be fed. A spring-pressed roller $b$ is adjustably mounted on the end of the table to produce tension on the strip as it is fed. A carriage $c$ embraces the table and is adapted to be reciprocated back and forth upon the flanges thereof, allowing clear space for the strip to pass beneath it.

Figure 15:
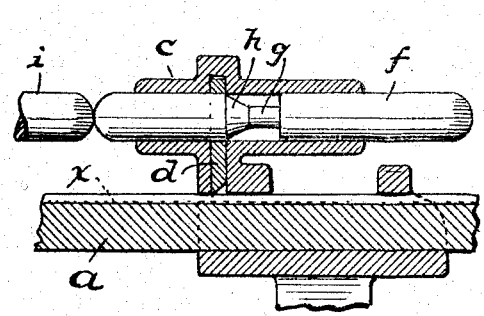
Figs. 14 and 15 are detail views of mechanism for feeding the strip, in two positions.
Figure 14:
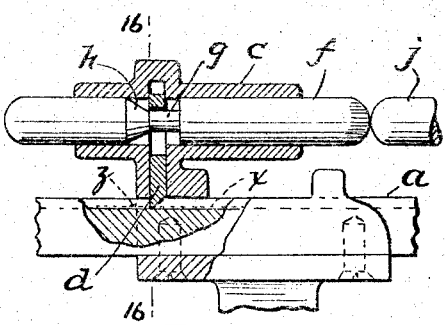
Figure 16:
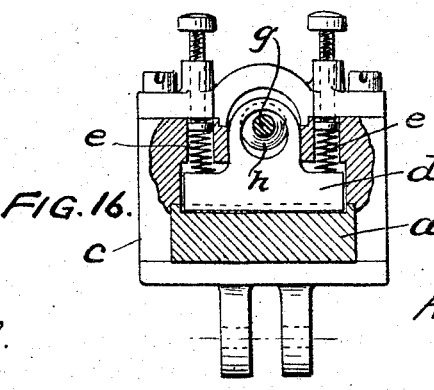
Fig. 16 is a vertical section on line 16—16, Fig. 14.

The carriage contains an impeller $d$, shown as a vertical plate whose bottom edge is beveled forwardly, in the direction the strip is to be fed. The impeller is adapted to slide vertically within the carriage, and is pressed downwardly by springs $e$. The idea is that in the forward movement of the carriage, to the left Fig. 1, impeller $d$ is pressed down upon the strip $x$ on the table and its beveled edge engages the strip and carries it along as the carriage is moved. Upon the return movement of the carriage, impeller $d$ is raised clear of the strip, which is, therefore, not moved thereby. To raise and lower the impeller, a longitudinal bolt $f$ is slidably mounted in the carriage and the impeller is provided with a perforated ear encircling said bolt. The bolt is cut down to a smaller diameter at $g$ by a beveled slope $h$. When the carriage is moving forwardly, that is, to the left as shown, the cut-away portion $g$ is opposite the impeller and the latter is pressed by its springs down upon the strip, as shown in Fig. 14. When the strip has been thereby carried along a distance equal to the length of a label, bolt $f$ contacts with an adjustable stop $i$ mounted on, but clear of, the table, and further movement of the carriage causes the bolt to slide therethrough. In this movement, the perforation in the ear of impeller $d$ is forced up the beveled slope $h$, raising the impeller clear of the strip, as shown in Fig. 15.

The carriage is now returned, to the right as shown, and just prior to the end of its backward motion, bolt $f$ is caused to contact with another adjustable stop $j$, which slides the bolt to the left relative to the carriage and allows the impeller to slide down the beveled slope and again operate upon the strip. Thus, at each double reciprocation of the carriage, the strip is fed forward a certain length dependent upon the setting of the adjustable stops $i$ and $j$, and upon the length of the throw of carriage, which is actuated by the following means.

A constantly driven shaft $k$ is mounted in the rear of the machine and is caused to drive a crank disc $l$, through universal joint $m$, shaft $n$, mitre gears $o$ and shaft $p$. By slot and pin motion $q$, the crank disc operates to oscillate an arm $r$, pivoted at its lower end to the base of machine and at its upper end connected to drive the carriage back and forth by a short link $s$. The length of this movement may be varied to suit the length of label, by raising or lowering shaft $p$, whose bearing is vertically slidable in a slotted stand $t$ and held in set position by nut $u$. The lower shaft $p$ is set, the longer will be the motion imparted to carriage $c$. To allow of this adjustment, the universal joint $m$ is required, and shaft $n$ is splined to its mitre gear $o$ to allow endwise movement of the gear when making this adjustment. A knob $v$ is provided for raising or lowering shaft $p$, and marks may be scored thereon as indicated, to represent corresponding lengths of labels.

The forwardly fed strip $x$ passes through shears of which the lower jaw 20 is a fixed edge and the upper jaw 21 is a movable blade pivoted to the frame of the machine and normally held in open position by spring 22 against a fixed stop. The tail of shear member 21 is kicked up by a cam 23 mounted on shaft $k$ and so set as to operate blade 21 directly following each forward feeding step of the label strip.

After blade 21 has acted to cut off a label, the remaining forward edge of the strip, which is pressed down by the shear, is again raised to table level, so that it may be fed forwardly without sticking, by pivoted arm 24. Arm 24 moves upon the face of the fixed shear blade 20 and is spring-pressed upwardly and maintained normally at table level by adjustable stop 25. As blade 21 descends in the shearing operation, the heel of the blade contacts with the end of arm 24 and presses the arm downward and when the blade snaps open again, the arm rises to table level carrying the end of trip $x$ up into line as desired.

Figure 11:
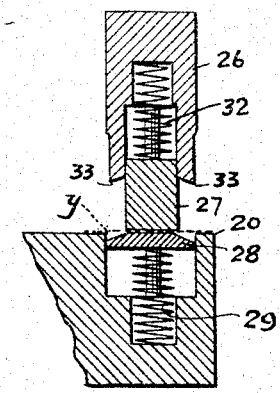

To firmly hold the label as it is being cut off, a press 26 is caused to descend upon it just prior to the shear action. Beneath the head 27 of the press, and inset within a recess in the table extension $a'$ is a removable die plate 28 held up to table level by springs 29 against a stop pin 30. Thus, the label, just as it is to be cut off, is held between the head 27 of the press and this die plate 28, whose springs are sufficiently stiff for the purpose, see Fig. 11.

After the shearing operation, the press is further lowered causing die plate 28 to sink within its recess and carrying the newly cut-off label $y$ with it. The die plate is of exactly the length the label is to be when folded and finished. Therefore, before pressing down, the label projects both sides of the die plate and when the press forces them into the recess in the table, these overhanging edges are turned upwardly.

Figure 12:
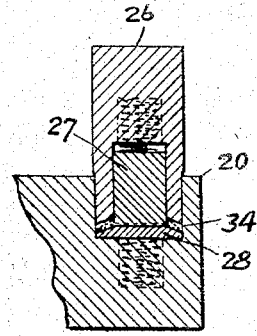

Head 27 is held in the press by a pin 31 against buffer springs 32, which are stiffer than springs 29, beneath the die plate. After the press has acted to force the die plate with the intervening label, down to the bottom of the recess, the press is further lowered to compress springs 32, forcing the head 27 up within the press. In the final downward movement, the head rises entirely within the press and the sides of the press itself contact with and press the label against the die plate. Said plate is slightly beveled at its edges and the sides of the press beveled to suit, as shown at 33. These descending beveled edges 33 strike the upturned edges of the label being pressed into the recess and turn them inwardly so they finally are pressed down upon the back of the label (the strip being run through the machine face downward) as indicated at 34 Fig. 12.

Figure 6:
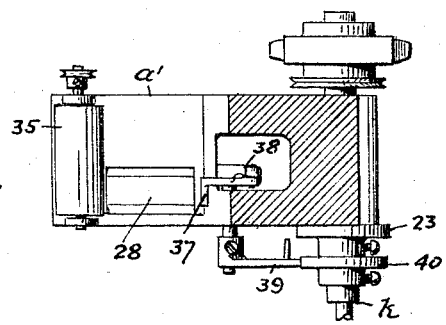
Fig. 6 is a plan view of the parts shown in Fig. 7.
Figure 8:
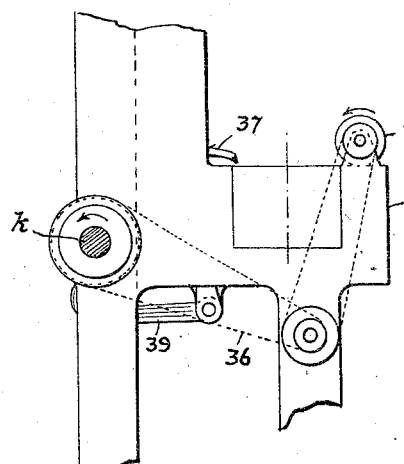
Fig. 8 is a view of the opposite side of Fig. 7.
Figure 7:
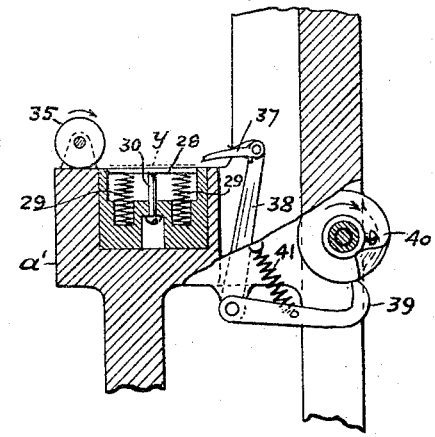
Fig. 7 is a side view of the parts shown in Fig. 6 partly broken away.

Upon the return movement of the press, the head 27 first is forced out by its buffer springs and then the die plate rises to table level, carrying the folded label between them. The head 27 then rises off of the label for clearance and the label is expelled from the machine by the means shown in Figs. 6, 7 and 8. A roller 35 is constantly driven at a relatively high speed from shaft $k$ by gearing 36, in the direction shown by the arrows. A spring-pressed kicker foot 37 is carried on an arm 38 of a bell crank, the other arm 39 of which is arranged to bear upon a cam 40 on shaft $k$ and pressed against said cam by a spring 41. The cam normally holds foot 37 out of action and out of the way of the advancing strip and the descending press, but it has a certain cut-away portion which at one point in its rotation allows arm 39 to snap into it and give foot 37 a forward kick. The cam is so positioned upon shaft $k$ that this kick occurs just subsequent to the final rising of the press as above described, and the kick of foot 37 moves the label beneath the revolving roller 35 which rapidly expels it from the table $a'$, to the left in Fig. 7, and at the same time gives the folded edges a final pressing, flat upon the label.

The press 26 and die plate 28 are both made removable to admit of various sizes being inserted in the machine dependent upon the length of labels being operated on. The press is held in the jaw of a vertical plunger 42, which is pressed upwardly by springs 43 and is actuated to press and fold the label by a cam 44 on driving shaft 45 mounted in bearings in the head of the machine. Cam 44 has two high points, the first of which causes the press to descend to table level, where it firmly holds the label while it is being cut off, and the second of which presses the die plate within its recess and accomplishes the folding.

The driving shaft 45 is driven as by means of a pulley 46 and carries a fly-wheel 47 to assist in smooth running over the pressing points of the rotation. A chain drive 48 connects the same size pulleys on shafts 45 and $k$ so these shafts are driven synchronously, a single rotation representing the cutting off and folding of a label, and the cams are so adjusted and set upon their shafts as to produce the results described in the correct order, one after the other.

Figure 9:
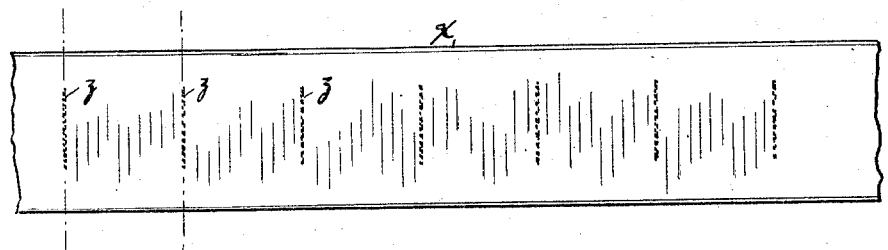
Fig. 9 illustrates a portion of a strip of labels.
Figure 13:
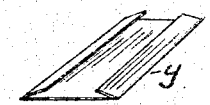
Figure 10:
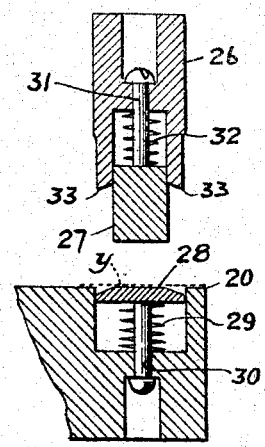
Figs. 10, 11 and 12 are detail sectional views showing three steps in the folding operation.

The label strip usually contains embroidered lines $z$ at equal intervals, as indicated in Fig. 9, marking the points at which the labels should be cut off. In the action of the feeding mechanism described, when the carriage $c$ has returned and is ready to trip bolt $f$, stop $j$ is so set as to allow the impeller $d$ to fall into action upon the strip just back of one of these markings $z$, as indicated in Fig. 14. The result is that as the carriage commences to move forward, the impeller slides upon the strip until it contacts with the mark of embroidery $z$, which is sufficient to catch and move the strip along with the impeller. By this means, the strip is moved forward a certain fixed distance dictated by the spacing of markings $z$.

Having now fully described my invention, what I claim and desire to protect by Letters Patent is:

1. A machine for forming labels from a continuous strip containing raised markings, comprising a reciprocating carriage, a lengthwise movable spindle carried thereby, an impeller strung on said spindle, a reduced section on the spindle whereby the impeller may drop into active relation with the markings on the strip, and an adjustable stop for the spindle, whereby the strip is fed an equal distance at each reciprocation.

2. A machine for forming labels from a continuous strip, comprising a folding press, a cutter adapted to sever the labels and means to feed the strip to the cutter and press in equal lengths, said means consisting of a reciprocated carriage, a lengthwise movable spindle in said carriage, a spring-pressed impeller orificed for mounting upon said spindle whereby it is normally held just out of engagement with the label strip, adjustable stops for arresting the stroke of the spindle before the carriage has finished its stroke, and a reduced section with bevelled ends on the spindle whereby the impeller is caused to move into and out of action with the label strip.

3. A machine for forming labels from a continuous strip, comprising a reciprocating feed carriage, a lengthwise movable spindle in said carriage, an impeller strung on said spindle just out of action with the label strip, a cam surface on said spindle for allowing the impeller to drop and feed the strip, an orifice shorter than a label, adjustable stops for the spindle whereby the strip is fed just enough to center a label over said orifice, cutting means between the carriage and the orifice, a plunger for pressing the centered and cut label into the orifice, a follower on said plunger for folding the severed ends of the labels, and means to operate the parts in the order and for the purpose described.

4. In a machine for forming labels from a continuous strip, a reciprocating carriage, an impeller in said carriage, means to lower the impeller onto the strip, and means to raise it out of contact therewith at any predetermined point in the forward movement of the carriage, whereby the feed may be arrested before the forward movement of the carriage has been completed.

In testimony of which invention I have hereunto set my hand, at Philadelphia, Pa., on this 12th day of February, 1923.

ARTHUR H. WALRATH.